United States Patent [19]

Broxmeyer

[11] Patent Number: 5,369,591
[45] Date of Patent: Nov. 29, 1994

[54] VEHICLE LONGITUDINAL CONTROL AND COLLISION AVOIDANCE SYSTEM FOR AN AUTOMATED HIGHWAY SYSTEM

[76] Inventor: Charles Broxmeyer, 6851 Strata St., McLean, Va. 22101

[21] Appl. No.: 29,722

[22] Filed: Mar. 11, 1993

[51] Int. Cl.$^5$ ............................................. G06F 15/50
[52] U.S. Cl. ..................... 364/461; 364/424.02; 364/436; 340/903; 340/436; 180/167; 342/455
[58] Field of Search .............. 364/424.02, 436–438, 364/449, 460, 461; 342/454, 455; 340/435, 436, 903, 905, 989, 991–993; 318/580, 587; 180/167–170

[56] References Cited

U.S. PATENT DOCUMENTS

| | | | |
|---|---|---|---|
| 3,899,671 | 8/1975 | Stover | 364/436 |
| 4,530,056 | 7/1985 | MacKinnon et al. | 364/424.02 |
| 4,621,705 | 11/1986 | Etoh | 340/903 |
| 4,703,429 | 10/1987 | Sakata | 342/455 |
| 4,819,174 | 4/1989 | Furuno et al. | 340/991 |
| 5,068,654 | 11/1991 | Husher | 342/455 |
| 5,091,726 | 2/1992 | Shyu | 340/903 |
| 5,111,401 | 5/1992 | Everett, Jr. et al. | 180/169 |
| 5,126,941 | 6/1992 | Gurmu et al. | 364/424.02 |
| 5,134,353 | 7/1992 | Kita et al. | 180/167 |
| 5,134,393 | 7/1992 | Henson | 180/167 |
| 5,165,497 | 11/1992 | Chi | 340/903 |
| 5,189,612 | 2/1993 | Lemercier et al. | 364/424.02 |
| 5,191,528 | 3/1993 | Yardley et al. | 364/424.02 |
| 5,229,941 | 7/1993 | Hattori | 364/424.02 |
| 5,230,400 | 7/1993 | Kakinami et al. | 364/461 |

*Primary Examiner*—Gary Chin

[57] ABSTRACT

This invention provides automatic longitudinal control of vehicles on highways, including speed control and protection against collision. The invention also provides for lane changing, following highway directional changes, route control, and transitions between the operator-controlled and the automatically controlled states. The invention is ideally configured to be employed jointly and cooperatively with previously developed means of automatic lateral control. Groups of permanent magnets are embedded in the highway surface at regular intervals. Permanent magnet sensors are installed in vehicles so that proximity and polarity indications of embedded magnets are obtained as a vehicle proceeds along the highway. Each group of magnets encodes a pseudo-random number that is sensed by the vehicle equipment and transmitted, via a radio link, to wayside computing equipment which determines vehicle longitudinal position and vehicle separation distances that are used as the basis of safety commands which are transmitted to the vehicles from the wayside. The system is configured to provide the highest possible reliability and fail-safe operation through employment of triply redundant communication and computation elements.

46 Claims, 7 Drawing Sheets

VEHICLE LONGITUDINAL CONTROL AND COLLISION AVOIDANCE SYSTEM FOR AN AUTOMATED HIGHWAY SYSTEM

BACKGROUND OF THE INVENTION

This application is an amended version of the application with U.S. Ser. No. 07/892,335 which was filed on Jun. 2, 1992.

1. Field of the Invention

This invention provides means for entry of driver-controlled vehicles into an automatic highway system, for transition of the vehicles to automatic control, for controlling the longitudinal motion of the vehicles on the highway, for protecting the vehicles against collision, and for effecting the transition back to driver control and exit from the highway. The invention employs reference means that are compatible with the reference requirements of an automatic lateral control system. The invention also provides means for interacting cooperatively with the lateral control system through provision of steering inputs needed by vehicles for following highway directional changes and for performing lane-changing operations. Finally, the invention provides means for insuring fail-safe and fail-operational performance.

2. Description of the Prior Art

It has been anticipated for many decades that current highway systems would be upgraded, through developments in technology, to enable complete automatic control of vehicles. A model of such a highway system was a popular feature of the 1939 New York World's Fair. The expected benefits of such a system were relief of the drivers from the strain and effort of controlling their vehicles, increased traffic densities and increased safety resulting from elimination of human error.

The primary technical problems associated with realization of automated highways are achievement of vehicle longitudinal control, through inputs to the braking and propulsion systems, and achievement of vehicle lateral control, through inputs to the steering system. Associated with these fundamental problems are higher-level problems such as lane changing, route control, headway control, collision avoidance and transitions between the operator-controlled state and the automatically controlled state.

Automated highway systems will be subject to unique safety constraints. Vehicles operating in public transportation systems uniformly observe the "brick-wall stopping criterion," which insures that vehicle spacing will allow a trailing vehicle to come to a safe stop at an emergency braking rate that will not subject passengers to injury or excessive discomfort, in the event that a leading vehicle makes an infinitely rapid stop (as if hitting a brick wall). Drivers of automobiles, on the other hand, consistently disregard the brickwall stopping criterion. Headways of two seconds or less, at speeds in the neighborhood of 55 mph, are common on highways. Such headway spacings are substantially shorter than the headway requirements of the brickwall stopping criterion. The vehicle capacity attained with an automated highway system must exceed, or at least equal, the vehicle capacity of existing highways, while substantially reducing the risk of collision. An automatic control system for vehicles on highways must permit a range of headways to accommodate road conditions and the headway policy of the operating authority.

Means proposed for automatic longitudinal control of vehicles on highways include microwave or optical radar systems for measurement of intervehicle distances (see, for example, S Shladover et al., "Automatic Vehicle Control Developments in the PATH Program," *IEEE Transactions on Vehicular Technology*, Vol. 40, No. 1, pp.114–130, Feb. 1991).

Lateral control means adapted to installation in automobiles were developed and tested at Ohio State University in the 70's. The Ohio State development was based on the "wire-follower" concept wherein a current-carrying wire in the surface of the roadway defines the path followed by the vehicle. Equipment on board the vehicle responds to the magnetic field of the current flowing in the wire and makes steering corrections to enable the vehicle to follow the desired path (see, for example, R. E. Fenton, "On the Steering of Automatic Vehicle: Theory and Experiment," *IEEE Transactions on Automatic Control*, Vol. AC-21, pp.306–315, June 1976). A disadvantage of wire-follower lateral control is a requirement for enclosing the wire in a slot in the roadway, since such modification of the roadway would make the roadway surface vulnerable to erosion from weather.

More recently, vehicle lateral control means have been based on the concept of defining the vehicle reference path by a sequence of magnetic nails driven into the highway. The reference means in this case would be less likely to expose the highway surface to weather damage than wire follower reference means. A group at the Institute of Transportation Studies of the University of California, in a joint venture with a private firm, has developed and demonstrated such a system (see W. Zhang et al, "Full-Scale Experimental Study of Vehicle Lateral Control System," *Transportation Research Board Record No.* 1358, pp. 36–41, 1992).

OBJECTS OF THE INVENTION

It is an object of this invention to provide safe, reliable cost-effective means of automatic longitudinal control of vehicles travelling on highways, longitudinal control encompassing speed regulation, speed changing and protection against collision.

It is another object of this invention to provide means for controlling vehicles cooperatively with an automatic lateral control system, by generating steering commands to enable vehicles to follow changing highway directions and to perform lane change maneuvers.

It is another object of this invention to provide vehicle control means that are both fail safe and fail operational, a fail-safe system providing protection against a hazardous condition arising as a result of component or subsystem failure, and a fail-operational system allowing safe continuing operation in the event of component or subsystem failure.

It is another object of this invention to provide highway reference means, serving the requirements of this invention, that are compatible with the requirements of an automatic lateral control system.

It is another object of this invention to provide highway reference means that are compatible with a fail-safe and fail-operational automatic lateral control system.

It is another object of this invention to provide means for transition of vehicles from the driver-controlled state to the automatically controlled state and for safe entry into the vehicle stream on highways.

It is another object of this invention to provide means for transition of vehicles from the automatically controlled state to the driver-controlled state and for departure from the highway.

It is another object of this invention to provide protection against failure of the lateral control means.

SUMMARY OF THE INVENTION

1. Basic Capabilities

This invention provides means for the entry of driver-controlled vehicles into an automated highway system, for transition of the vehicles from driver control to automatic control, for operation of the vehicles under automatic control on the highway, and for transition of the vehicles back to driver control and departure from the highway. The invention provides for all aspects of longitudinal control, including speed regulation, speed changing and protection against collision.

2. Relation to Lateral Control System

This invention is ideally configured to be employed jointly and cooperatively with an automatic lateral control system of the type described in the cited reference by Zhang et. al., since both the invention and the lateral control system employ identical highway reference means. The invention also provides inputs required for the lateral control system.

An automatic lateral control system accomplishes its function through control of the vehicle steering system. The primary function of a lateral control system is to maintain vehicles on a reference course within a highway lane. This is generally accomplished by feeding back a measure of the vehicle deviation from the reference course to correct steering. Close following of changes in highway direction require an anticipatory, externally derived, steering signal to establish the nominal vehicle direction and keep the deviation from the reference course from becoming excessive. An externally derived steering signal to guide vehicles in the performance of lane-changing maneuvers is also required. This invention supplies such externally derived steering signals.

It is expected that, in initial test applications, steering control to cause vehicles to change lanes may be exercised by the drivers of the vehicles. The invention is capable of full integration with either automatic or manual lane changing means and is adaptable to partial automatic operation as may be required for integration and test operations.

3. Description of the Invention—Basic Configuration

The highway on which the vehicles travel is divided into zones several miles in length. Embedded in each lane of the highway, at intervals of about one meter, are groups of permanent magnets that serve as reference markers for vehicle motion along the highway. The reference markers are installed so that in some cases the north magnetic pole is uppermost while in other cases the south magnetic pole is uppermost.

A group of permanent magnets generally comprises three magnets, each magnet being emplaced on a line parallel to the highway centerline. The three magnets belonging to a group are equally spaced on a line normal to the direction of vehicle travel.

As a vehicle proceeds along the highway, magnet sensors, located at the bottom of the vehicle, sense proximity with the magnetic reference markers and determine the polarity of the uppermost magnetic poles. The reference marker information is a basic input required by this invention. Magnetic field intensity information, derived from the reference markers, is also required as a basic input by the referenced lateral control system. The proximity and polarity information derived from the reference markers (or a subset thereof—see *Description of the Preferred Embodiments*) is transmitted to a wayside radio receiver by a radio transmitter on board the vehicle. The transmitters of all vehicles within the zone are linked to the wayside receiver by a number of unique zone frequency bands, needed for several message priority categories. Vehicle transmissions are separated through time-division multiplexing, each vehicle being assigned a periodic time slot for transmission and reception while in the zone.

The information received at the wayside is transferred to a zone computer which determines vehicle position by adding a known position increment, to an initially known vehicle position, each time an indication is received that a group of reference markers has been passed.

The zone computer, further, determines the spacing between successive vehicles in each lane, for all pairs of vehicles having a trailing vehicle within the zone. If an unsafe proximity between vehicles is detected, the computer generates a safety command, such as "emergency stop", for transmission to the trailing vehicle.

The zone computer has connections with the computers of the neighboring upstream and downstream zones. These connections enable transfer of information regarding vehicle position, for determination of spacing of vehicle pairs, when the leading vehicle is in the downstream zone, and enable handoff of zone responsibility as vehicles move into successive downstream zones.

Each group of reference markers has an arrangement that represents a binary number, an uppermost north pole representing a one and an uppermost south pole representing a zero. These numbers are selected to be members of a pseudo-random sequence, each member of the sequence being associated with a position along the highway. The zone computer compares the number most recently sensed by the sensing equipment with a number, previously stored in the zone computer, that is known to be associated with the most recently updated vehicle position. If these numbers differ, an error has occurred in the process of sensing, transmitting or computing information. If such an error is detected, the zone computer takes corrective action.

Vehicles will normally travel at a nominal speed established for the zone, speed regulation being accomplished by on-board equipment. When it is determined by the zone computer that a vehicle must take some action, such as applying brakes to maintain safety, or changing to a different speed, the zone computer generates a command to this effect.

The command generated by the zone computer is transferred to a zone radio transmitter and transmitted to an on-board receiver. The receiver transfers the command to an on-board vehicle control unit.

The vehicle control unit receives, from the on-board receiver, all transmissions of the zone computer that are directed to the vehicle. These transmissions include communication timing signals, zone transition information, information regarding zone communication frequencies and commands to change speed or to undergo an emergency stop.

Upon receipt of a speed-change or emergency-stop command, the vehicle control unit generates an analog signal input for the vehicle propulsion system, or the braking system, to effect the required change of motion. The vehicle control unit also has other functions such as determining vehicle speed from magnet sensor information, timing of communications, and providing information to the lateral control system.

A central management computer, interconnected with the zone computers, provides for functions that require interzonal coordination, such as setting system speed limits and responding to weather conditions, and also provides means for general oversight and intervention by human operators.

From time-to-time it will be necessary for vehicles to change lanes. When a vehicle changes lanes, the magnet sensors at the bottom of the vehicle will become misaligned with the embedded magnetic markers in the highway surface. Thus, the markers, in this case, can not serve as fixed references for determining vehicle position. During lane-changing operations, the function of measuring, incrementally, the longitudinal position, is taken over by odometers at the wheels of the vehicle.

A lane-change maneuver is accomplished by commanding a vehicle, from the wayside, to steer so that a pre-programmed lateral position change is carried out. Such a maneuver requires precise measurement of the lateral travel of the vehicle into an adjoining lane. The deviation between actual and commanded lateral travel is fed back to correct steering. In this invention, the lateral travel of the vehicle, during lane changing, is determined by the vehicle control unit from the outputs of an odometer and of a single-degree-of-freedom gyroscope that is installed in the vehicle with its input axis aligned with the vertical axis of the vehicle. When the vehicle turns, the gyroscope produces an output that measures, in quantized increments, the turning angle of the vehicle.

The odometer outputs are resolved into components normal to, and parallel to, the highway centerline, and the components are summed. The resolution is determined by the vehicle control unit from operations performed on the gyroscope incremental angular motion measurements. By this means a running measure is kept of the vehicle's lateral and longitudinal motion during periods when its longitudinal axis is misaligned with the highway centerline.

The indication of lateral motion also serves a monitoring function by detecting undesired motion of the vehicle that may be caused by failure of the lateral control system.

Safe longitudinal separation between a merging vehicle, and the leading and trailing vehicles in the adjoining lane, is monitored from the wayside, and the affected vehicles are subject to safety commands generated by the zone computer. When necessary, safe merge conditions are created by the zone computer which generates speed change commands for this purpose.

Entry of vehicles into the traffic stream on a highway (as well as exit from the highway) requires coordination between the driver and the automatic control system to provide for relinquishing (or assuming) of driver control, and confirmation of the control state (driver controlled/automatically controlled) of the vehicle. This coordination is effected through an on-board driver interface unit that receives information from the vehicle control unit and communicates this information to the driver via audio and visual means. The driver interface unit also receives information from the driver for relay to the wayside.

A newly arrived vehicle is tested, via radio, for readiness to enter the highway. If ready, the vehicle enters an entrance zone where it receives, via radio, essential communications information, and where its initial position reference is established. The driver then relinquishes control of the vehicle to the automatic control system. When safe merge conditions exist, as monitored from the wayside, a merge maneuver into the adjoining lane is executed.

Vehicle departure from the highway is scheduled by the central management computer. The central management computer alerts the zone computer of the zone of departure, which, at an appropriate time, commands the vehicle to begin a series of lane changes that will place the vehicle in an exit lane. When this lane is reached, the driver assumes full longitudinal and lateral control of the vehicle and removes it from the highway.

4. Description of the Invention—Fail-Operational Configuration

This invention, in its basic configuration, will cease to function as a longitudinal control and collision avoidance system if a critical component or subsystem fails. The invention has built-in protection against a magnet sensor failure; however modification is necessary to prevent a hazardous condition from arising as a result of other component or subsystem failure.

Rail-system practice reduces the probability of system failure to an extremely low level through employment of highly reliable "vital" relays as critical safety system elements. Rail-system practice also insures that systems are not vulnerable to failure of a single nonvital element. An approach to achievement of extremely high reliability consists in employment of three parallel redundant elements in conjunction with vital means for comparing the outputs of these elements, identifying two-out-of-three functioning elements, in the event one of the elements has failed, designating one of the functioning elements as the operative element, and removing the failed element from effect on the system. Discrimination devices that perform the above process are termed voters or comparators. A vital comparator achieves fail-safe operation through the voting process, cross checking between redundant elements and self-checking within redundant elements.

Use of redundant elements in conjunction with vital comparators allows achievement of fail-operational in addition to fail-safe performance. While a fail-safe configuration provides protection against hazardous conditions, it may require inconvenient operations such as emergency stopping on the highway. A configuration that is fail operational as well as fail safe allows continuing nondisruptive function in the event of a component or subsystem failure.

As already noted, permanent magnet groups are arranged so theft vehicle magnet sensors produce a three-bit parallel output when a magnet group is crossed. Thus, if a sensor fails, the output of the remaining sensors, when a magnet group is crossed, gives a definite indication that an incremental unit of vehicle travel has occurred.

The fail-operational configuration of this invention employs three on-board radio transmitters, each transmitter receiving the outputs of all magnet sensors. The transmitters, operating in unique frequency bands associated with the zone, transmit the magnet sensing information to three zone radio receivers at the wayside, each transmitter being paired with a specific receiver. The receiver outputs are presented to a vital comparator which has the capability to identify a malfunctioning transmitter/receiver channel and which designates one of the three receivers as the operative receiver.

The operative receiver provides identical sensing information to three identical zone computers. Each zone computer also receives information from a designated operative computer in the upstream zone and a designated operative computer in the downstream zone, the designations being made by vital comparators monitoring the critical outputs of three parallel computers in the upstream zone and three parallel computers in the downstream zone.

The critical outputs of the three zone computers are presented as inputs to a vital comparator which designates one of the three zone computers as the operative zone computer. Selected outputs of the operative zone computer are routed to the three computers in the upstream zone, to the three computers in the downstream zone, and to three zone radio transmitters. The inputs to the transmitters are transmitted to the vehicles, each vehicle receiving inputs through three radio receivers, each transmitter being paired with a specific receiver on board a vehicle.

The outputs of the three receivers are presented as inputs to three identical vehicle control units, each receiver being paired with a specific vehicle control unit. A vital comparator, monitoring critical outputs of the three vehicle control units, designates the operative vehicle control unit. The operative vehicle control unit provides necessary analog control signals to the propulsion system and to the braking system, and performs other functions, as already discussed, including control of timing and communications, determination of vehicle speed, speed regulation, interaction with the driver interface unit, provision of steering signals to the lateral control system to effect lane changing and lane following, and monitoring of vehicle lateral motion as a safeguard against failure of the lateral control system.

DESCRIPTION OF THE PREFERRED EMBODIMENTS

1. Basic Configuration

This invention provides means for entry of driver-controlled vehicles into an automatic highway system, for transition of the vehicles to automatic control, for controlling the longitudinal motion of the vehicles on the highway, for protecting the vehicles against collision, and for effecting the transition back to driver control and exit from the highway. The invention employs reference means that are compatible with the reference requirements of an automatic lateral control system. The invention also provides means for interacting cooperatively with the lateral control system through provision of steering inputs needed by vehicles for following highway directional changes and for performing lane-changing operations. Finally, the invention provides means for insuring fail-safe and fail-operational performance.

Figure 1:
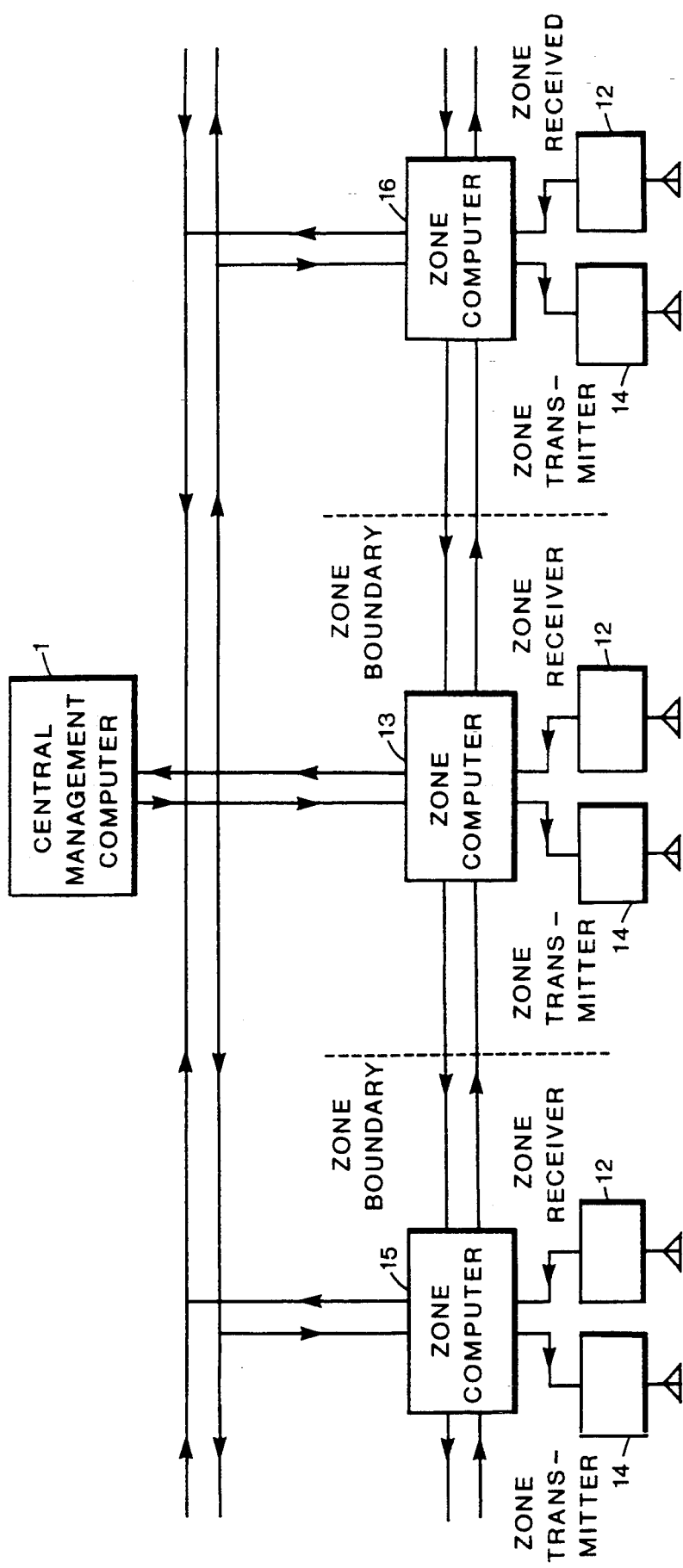
FIG. 1 is a block diagram illustrating the major wayside elements of the invention.
Figure 2:
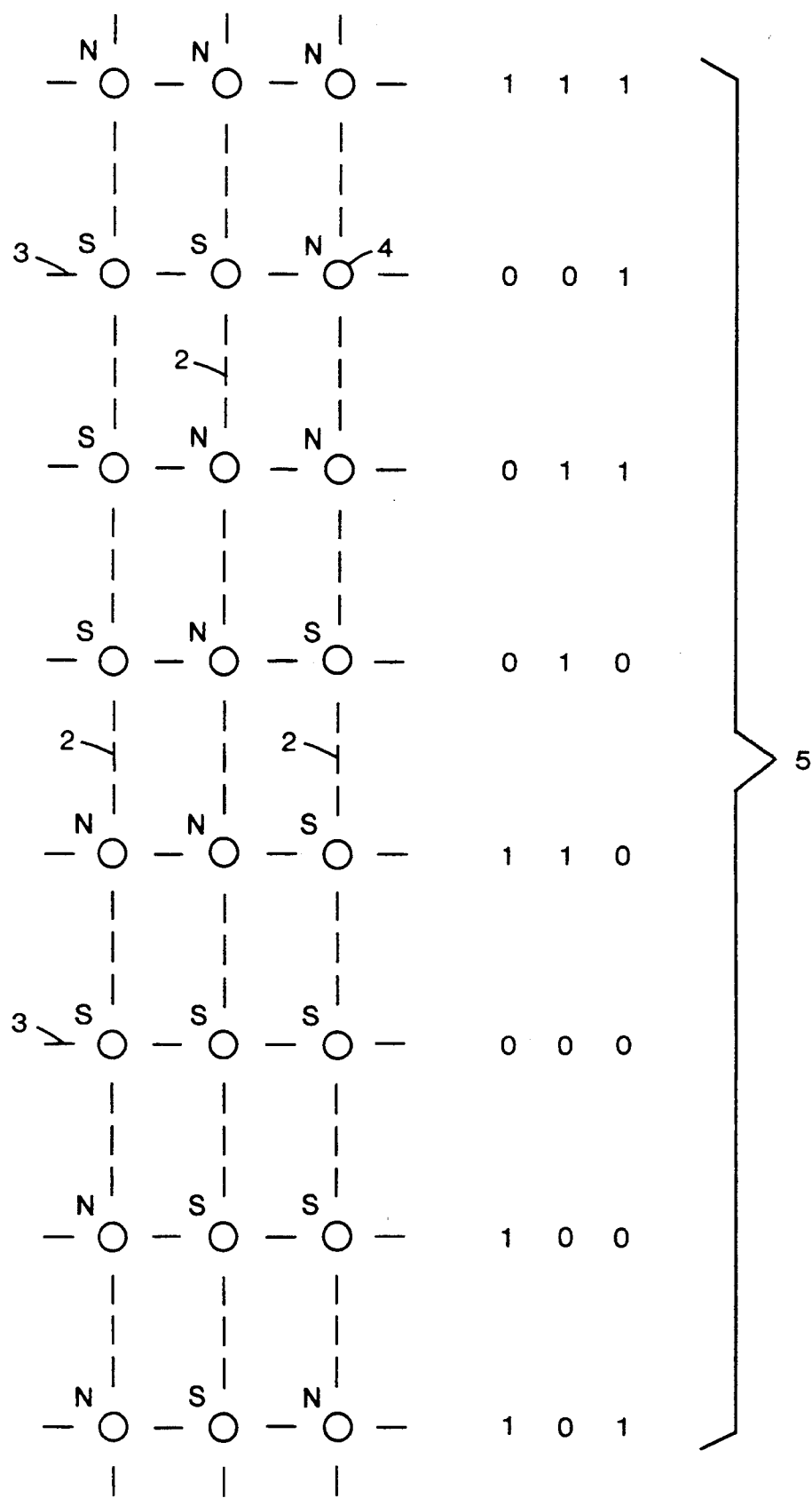
FIG. 2 illustrates a typical layout of reference markers installed in the highway and the corresponding numerical representations of the reference markers.
Figure 3:
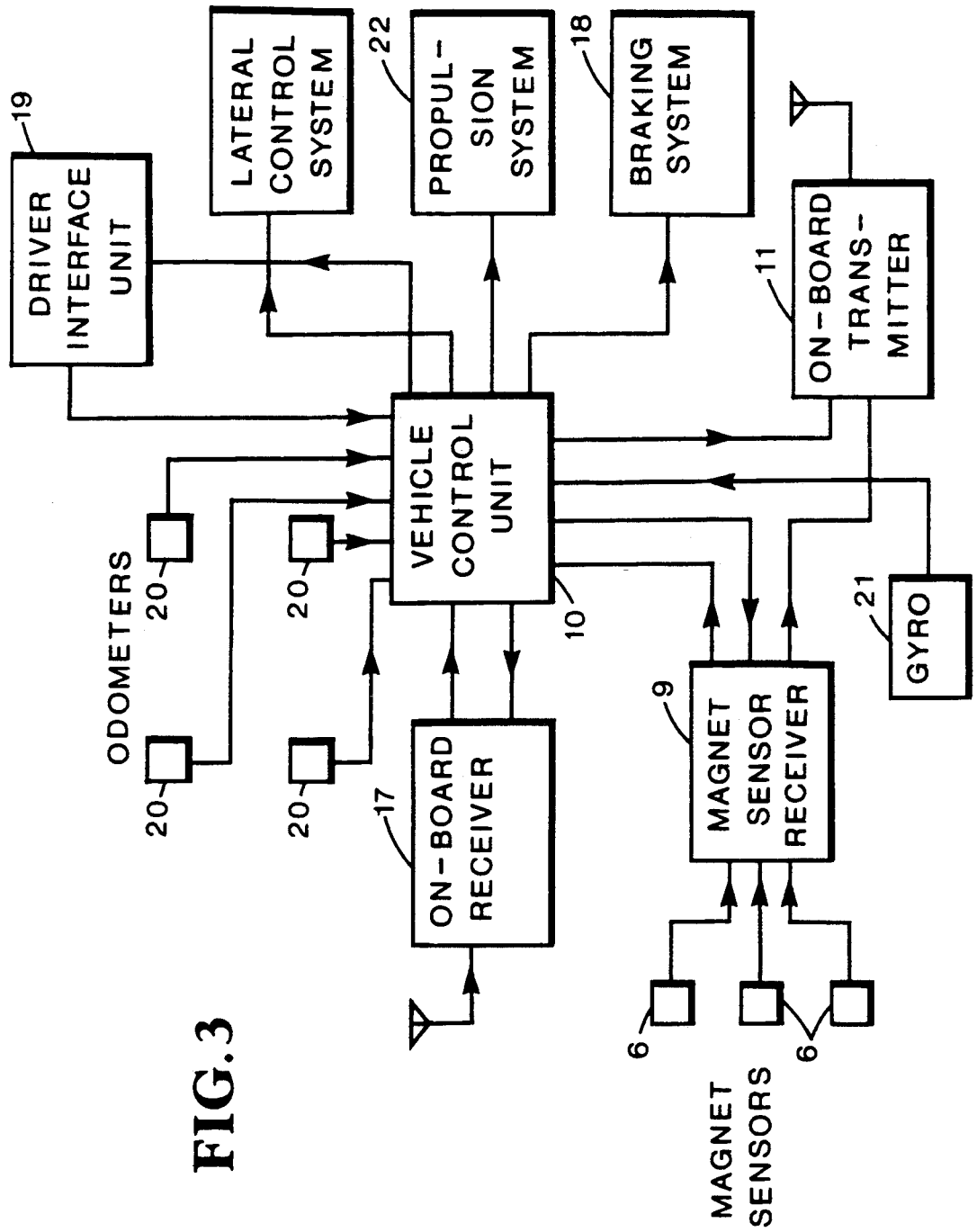
FIG. 3 is a block diagram illustrating the major elements on board each vehicle.

The invention provides a heirarchy of control equipment, including a central management computer 1 and wayside equipment distributed along the highway as shown in FIG. 1, reference means installed in the highway as shown in FIG. 2, and on-board equipment as shown in FIG. 3. The wayside equipment is organized as a periodic structure, the highway being divided into zones several miles in length, each zone having an identical complement of equipment.

Central management computer 1 provides for general oversight, policy functions such as setting speed limits and responding to weather conditions, communication with the wayside equipment and intervention by human operators.

The wayside equipment provides for zone-localized functions categorized as routine operations, and zone-management functions. Routine operations are those necessary for safe operation of vehicles on the highway, and include communication with central management computer 1, communication between equipments in neighboring zones, communication with vehicles, data processing and control signal generation necessary for setting vehicle speeds and preventing collisions, entry and exit of vehicles from the highway and transitions between the driver-controlled and automatically controlled states. Other routine operations include provision of inputs required by the lateral control system to effect lane changing and following of changes in highway direction.

Zone management functions include responding to unusual conditions such as vehicle malfunctions and breakdowns, and restarting stopped vehicles.

Figure 4:
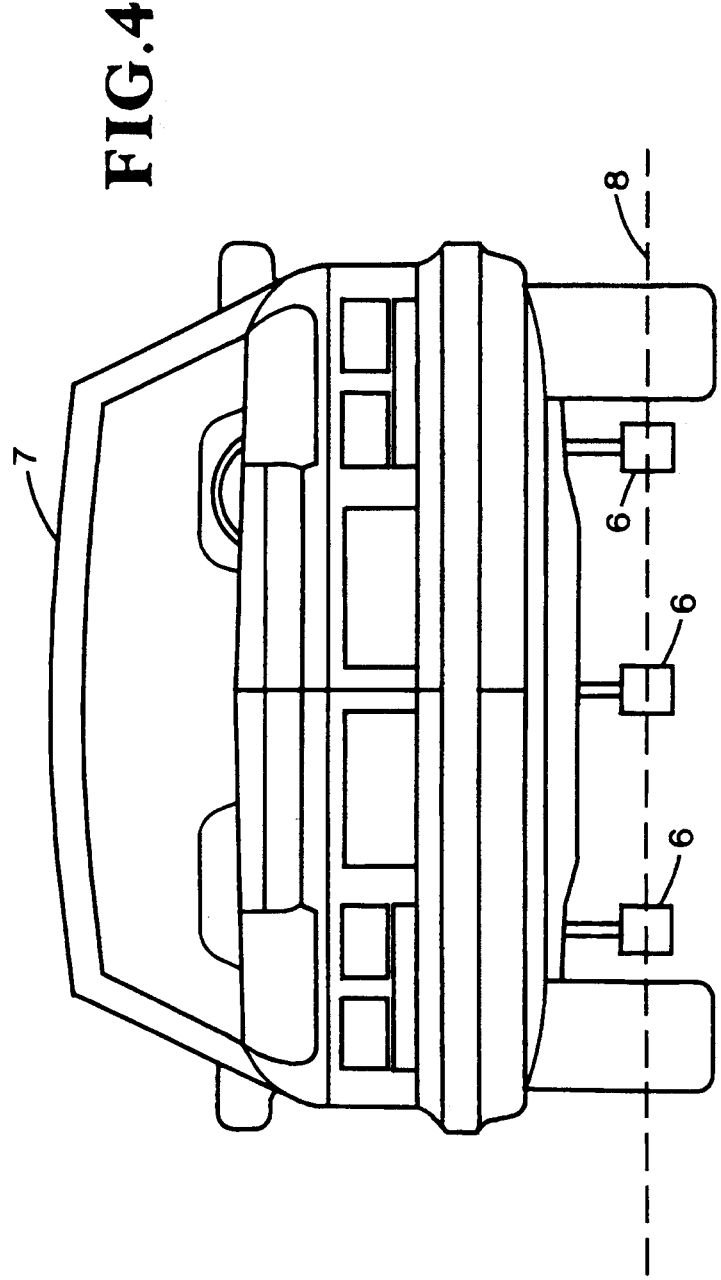
FIG. 4 is a schematic front view of a vehicle, illustrating the mounting of reference marker sensors.
Figure 5:
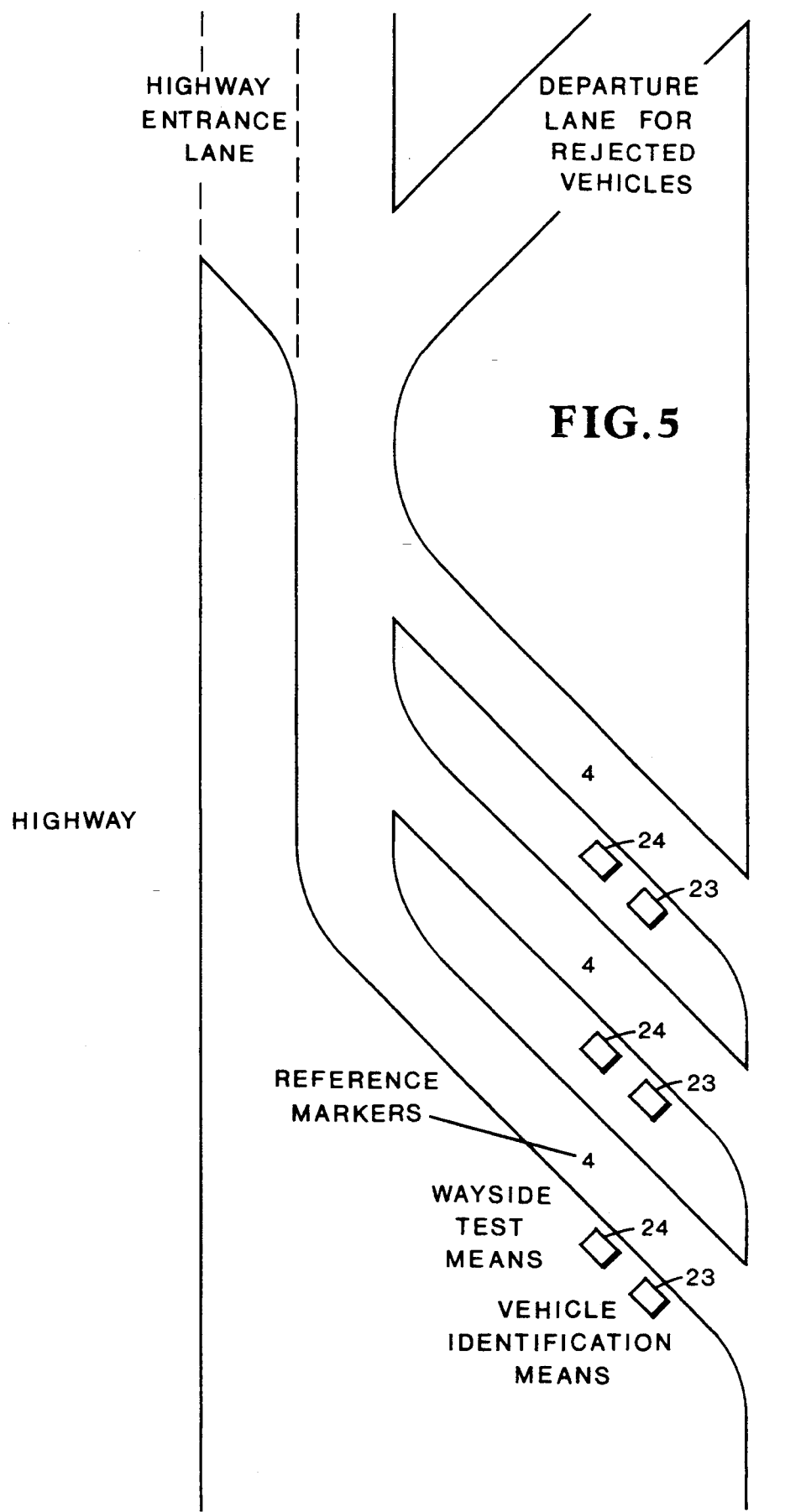
FIG. 5 is a schematic illustration of a highway access area.

On-board equipment, shown schematically in FIG. 3, provides for sensing of proximity and polarity of permanent magnet highway reference means, shown in FIG. 2, by on-board sensing equipment, shown in FIG. 4, and communication with wayside equipment, speed regulation, responding to wayside commands regarding speed changes, emergency stopping, communication with drivers, entry and exit of vehicles from the highway, transitions between the driver-controlled and the automatically controlled states, provision of inputs for the lateral control system, and monitoring of vehicle lateral travel as a safety check on the lateral control system.

Referring now to FIG. 2, a highway is divided laterally into lanes and longitudinally into zones, the zone boundaries being normal to the direction of vehicle travel. The zones are further divided into subzones, the subzones being of uniform length. Each highway lane is, additionally, divided into sublanes by sublane boundaries 2 interior to the lane, the sublane boundaries being parallel to the direction of vehicle travel.

On each subzone boundary 3, an arrangement of reference markers 4, in the form of permanent magnets, is embedded in the highway surface. Magnets are emplaced only at the intersections between subzone boundaries and the interior sublane boundaries. The axes of the magnets are vertical. In some cases, the north pole of the magnet is uppermost, while in other cases the south magnetic pole of the magnet is uppermost.

The sequence of magnet arrangements on successive boundaries can be represented by a sequence of binary numbers, as shown in FIG. 2, where a south magnetic pole is represented by an "S" and a north magnetic pole is represented by an "N".

A useful sequence for the purposes of this invention is a pseudo-random sequence of binary numbers, a pseudo-random sequence having desired statistical properties while being generated by a deterministic process.

The data-input requirements of the cited automatic lateral control system are magnetic field measurements derived from magnets spaced, longitudinally, at one-meter intervals. Accordingly, the subzone boundaries are spaced one-meter apart. It is assumed that successive members of the pseudo-random sequence always differ.

Suspended from each vehicle are magnet sensors 6 as shown in FIG. 4. The magnet sensors are emplaced beneath vehicle 7, so that they come into momentary proximity with permanent magnets 4 as the vehicle moves along the highway. Magnet sensors 6 are installed on a line 8, that is normal to the vehicle longitudinal axis and is parallel to the highway surface, so that, when the presence and polarity of magnets on a subzone boundary are sensed, the sensing indications are essentially simultaneous. Thus, the outputs of magnet sensors 6, when a subzone boundary is crossed by a vehicle, represent a binary number keyed to the location of the boundary along the highway. The outputs of magnet sensors 6 also serve to indicate the presence of the boundary.

Since a vehicle may deviate from a nominal path, owing to the action of the lateral control system, magnet sensors 6 must give positive indications of magnet proximity and polarity within the allowed lateral deviation of the vehicle.

The magnet sensor indications are received as a parallel input by magnet sensor receiver 9, shown in FIG. 3. The sensor indications are stored in this unit until, under control of a timing signal generated by on-board vehicle control unit 10, the sensor indications, are transferred serially to on-board radio transmitter 11, for transmission to the wayside.

Magnet sensor receiver 9 also has the function of transmitting a timing signal to vehicle control unit 10, immediately upon receipt of the magnet sensor indications, indicating that a subzone boundary has been crossed. This indication is needed for speed determination as discussed later.

With the constraints, as noted, the serial magnet sensor indications are modulated by on-board transmitter 11 and transmitted to zone receiver 12 shown in FIG. 1. Zone receiver 12, in turn, demodulates the data and transfers it to zone computer 13. Zone computer 13 maintains an up-to-date measure of vehicle longitudinal position. Upon receipt of the magnet sensor data, zone computer 13, employing the magnet sensor data as an indicator that a known incremental length of highway has been traversed, updates the measured longitudinal position of vehicle 7.

Data processing, at the wayside, is performed by a number of zone computers as indicated in FIG. 1, each computer being associated with a specific zone. Zone computer 13 receives information, via zone radio receiver 12, from vehicles having a corresponding zone designation. Zone computer 13 also transmits information, via zone radio transmitter 14, to vehicles having the same zone designation.

The zone designation of a vehicle generally corresponds to the zone actually occupied by the vehicle; however a small number of vehicles have zone designations that differ from the zone occupied, as discussed below.

Zone computer 13 also receives information from upstream zone computer 15 and downstream zone computer 16. Zone computer 13, further, transmits information to upstream zone computer 15 and to downstream zone computer 16.

Communication between upstream and downstream zones is needed for coordination of zone-to-zone handoff of vehicle monitoring and communication responsibilities as vehicles proceed downstream. Communication is also needed for transfer of vehicle longitudinal position information from downstream zones to upstream zones as discussed below.

From the measured longitudinal positions generated by zone computer 13, for vehicles with which it is in direct communication, and from corresponding information received from downstream zone computer 16, zone computer 13 determines the intervehicle distances between all pairs of adjacent vehicles that have a trailing member with a designated zone corresponding to the zone of zone computer 13. If the distance between the members of any pair of vehicles is less than a previously determined safe separation distance, zone computer 13 generates one of the following commands for the trailing vehicle: emergency stop, normal stop or reduce speed to X miles per hour. Selection of the appropriate command to ensure safe operation, while causing minimum disruption of traffic flow, will be a matter of system policy to be determined by operating experience.

The command is transferred to zone transmitter 14, which transmits it to on-board receiver 17 located on the trailing vehicle. On-board receiver 17 relays the command to on-board vehicle control unit 10. This unit, in turn, generates an analog braking signal which is transferred to vehicle braking system 18 for execution.

To protect the system against unrecognized error, a reference is provided by the previously mentioned pseudo-random sequence of numbers. Each member of the pseudo-random sequence, that is encoded by the magnet arrangements on the subzone boundaries, is stored in zone computer 13, in association with the corresponding longitudinal position of the subzone boundary.

As already noted, measured longitudinal position is determined and updated by zone computer 13 and is associated with the most recently acquired magnet sensing information. The magnet sensing information received in zone computer 13 is a pseudo-random number keyed to the most recently crossed subzone boundary. Zone computer 13 compares the sensed number with a pseudo-random sequence member taken from storage. The stored sequence member that is selected for the comparison is that member which has an associated longitudinal position equal to the measured longitudinal position of the vehicle.

If the compared numbers are not identical, an error has occurred in sensing, transmitting or computing data. However, non-coincidence of the compared data does not, in itself, indicate a hazardous condition.

In the event of a magnet sensor failure, the vehicle position can be updated from the information provided by the remaining sensors. Accordingly, failure of a sensor is not a catastrophic event and the vehicle can be safely removed from the highway under automatic control. In this event, as discussed later, odometers are available to provide backup information or to serve as the primary source of position information.

If a component of the system other than a sensor fails, the longitudinal control system provides safety protection as discussed below under 2. Fail-Operational Configuration.

Control of vehicles on the highway requires that information be conveyed to and received from drivers. This communication is carried out through driver interface unit 19. Driver interface unit 19 provides displays and audio information and requests actions and information inputs from the driver which are necessary for lane-changing operations, for entry and exit of vehicles from the highway, and for handling of unusual situations. Driver interface unit 19 provides easily assimilated displays and audio outputs which, to conserve communication subsystem bandwidth, are preprogrammed. From time-to-time it will be necessary for vehicles to change lanes. This is evident if the automatically controlled vehicles are to operate on multilane highways. Vehicles that enter the highway from the right must, generally, migrate across the highway to insure full utilization of all lanes. Vehicles departing from the highway must, generally, move to a departure lane at the right.

When a vehicle changes lanes, magnet sensors 6 at the bottom of the vehicle will become misaligned from the embedded magnetic markers 4 in the highway surface. Thus the markers, in this case, can not serve as fixed references for determining vehicle position.

During lane-change operations, the function of measuring, incrementally, the longitudinal position changes of vehicle 7 is taken over by odometers 20, shown in FIG. 3, at the wheels of the vehicle. Odometers 20 are encoder units that produce a pulse with a given incremental rotation of a wheel.

Accurate measurement of position from odometer information requires precise knowledge of effective wheel radius, a quantity that will vary with tire wear and tire pressure. In this invention, odometers 20 are calibrated against information obtained from the magnetic marker groupings. Vehicle speed is determined by vehicle control unit 10 from measurements of the time interval between crossings of magnetic marker groupings, as discussed later.

Vehicle speed is also determined by vehicle control unit 10 by counting the number of pulses received from odometers 20 in a specified interval of time. The comparison of vehicle speeds results in a calibration factor, applied by vehicle control unit 10 to the outputs of odometers 20.

Odometers 20 may also be employed as backup devices for the magnet sensing means if a malfunction develops in the magnet sensing and data transmission subsystems. Odometers 20 also have the capability of providing vehicle translation information, in place of the magnet sensing means, if calibrated against reference data obtained from the magnet sensing means. In this case, fewer magnets may be needed than when the magnet sensing means are the primary sources of vehicle translation measurement.

Lane changing generally involves merging into a stream of vehicles in an adjoining lane. During a lane-change operation, zone computer 13 provides for safe merging by:

monitoring longitudinal separations between the merging vehicle and the leading and trailing vehicles in the adjoining lane in which the merge will be completed, insuring, prior to initiation of the merge, that an open "slot" exists for the merging vehicle to move into, commanding, when necessary, speed changes in the merging vehicle, and in the leading and trailing vehicles in the adjoining lane, to create a slot and to align the merging vehicle with the slot, exercising safety controls based on longitudinal separations between the merging vehicle and the leading and trailing vehicles in the adjoining lane.

The decision to undertake a lane-change maneuver will generally be made by zone computer 13 as a way of distributing traffic. When safe merge conditions exist, zone computer 13 generates a signal initiating the lane change. Vehicle control unit 10, in response, transfers the position sensing function to odometers 20. Vehicle control unit 10 also generates a steering signal causing the lateral control system to guide the vehicle into the adjoining lane.

The lane-changing maneuver requires precise measurement of the lateral travel of the vehicle into the adjoining lane. Furthermore a precise measurement of the vehicle's longitudinal motion along the highway must be maintained. The lateral travel of the vehicle is computed by on-board vehicle control unit 10 from the outputs of odometer 20 and single-degree-of-freedom gyroscope 21 which is installed with input axis aligned with the vertical axis of the vehicle.

The incremental lateral travel of vehicle, along its longitudinal axis, measured from some starting point, is the summation $$S_{LAT} = \Sigma \delta S \cos\theta$$

The longitudinal travel is $$S_{LON} = \Sigma \delta S \sin\theta$$

where $\theta$ is the angle between a normal to the highway centerline, at the vehicle, and the direction of the vehicle's longitudinal axis, and $\delta S$ is the measure of incremental vehicle motion derived from the odometer outputs.

The gyroscope output is quantized, an output $\delta\theta_g$ being produced corresponding to a rotation of this amount about its input axis. The gyroscope output includes a component of incremental angular rotation $\delta\theta_e$ corresponding to the rotation of the earth and a component of incremental angular rotation $\delta\theta_m$ corresponding to the rotation of a normal to the roadway centerline. These components must be removed from the gyroscope output.

Vehicle control unit 10 computes the quantities $\cos\theta$ and $\sin\theta$ from the equations $$\delta(\cos\theta) = -\sin\theta \cdot \delta\theta$$

$$\delta(\sin\theta) = \cos\theta \cdot \delta\theta$$

$$\delta\theta = \delta\theta_g - \delta\theta_e - \delta\theta_m$$

The above means allow vehicle control unit 10 to maintain a running measure of the vehicle's lateral and longitudinal motion. During a lane-changing operation, the deviation between measured and commanded lateral travel is fed back to the lateral control system to correct steering.

When the lane change has been completed, the vehicle longitudinal position measuring function is returned to magnet sensors 6 and zone computer 13. The lateral position indication produced from the odometer and gyroscope outputs serves to indicate an excessive lateral position deviation that would result from failure of the lateral control system.

Vehicle speed is set from the wayside, being commanded by zone computer 13, and an indicator of the speed is resident in vehicle control unit 10. Speed regulation at the commanded level is accomplished by vehicle control unit 10 through generation of analog signal inputs for braking system 18 and propulsion system 22.

As already noted, necessary feedback of vehicle speed is obtained from the magnet sensors when the vehicle is not changing lanes and from odometers 20 when the vehicle is changing lanes.

A signal denoting that a subzone boundary has been crossed is transmitted to vehicle control unit 10 by magnet sensor receiver 9 immediately following receipt of a set of magnet sensor indications. Vehicle speed is determined by vehicle control unit 10 from measurement of the time between magnet sensor indications. In the case of odometers 20, incremental measures of position change are much finer grained than magnet sensor indications, and vehicle control unit 10 determines speed by summing odometer pulses over a fixed interval of time.

Vehicle control unit 10 acts to minimize the difference between the commanded vehicle speed and the measured speed, appropriately configuring analog inputs for vehicle braking system 18 and vehicle propulsion system 22 to insure that speed changes (including emergency stopping) are limited with respect to acceleration and jerk.

A vehicle entering the highway proceeds through an access area under driver control. In the access area, the vehicle encounters vehicle identification means 23 and wayside test means 24. Vehicle identification means 23 may be a scanning device, such as a bar-code reader that scans a bar code pattern on the side of the vehicle, or may be a device that interrogates the vehicle, via radio, requesting a stored identification.

After the vehicle has been identified from the wayside, wayside test means 24 transmit test radio signals to the vehicle which are received by on-board radio receiver 17 and transferred to vehicle control unit 10. Communication between wayside and vehicle is carried out, initially, on entry frequency bands. The test radio signals received from wayside test means 24 command a preprogrammed speed change. Wayside test means 24 verify, from the response received from on-board radio transmitter 11, that the vehicle responds appropriately, indicating that vehicle control unit 10, vehicle braking system 18, vehicle propulsion system 22, magnet sensor receiver 9, magnet sensors 6, on-board radio receiver 17 and on-board radio transmitter 11 are operational.

From the above tests, wayside test means 24 verify the readiness of the vehicle to enter the highway. If readiness is not verified, the vehicle is not permitted to enter the highway.

If the vehicle is ready to enter the highway, wayside test means 24 provides a verification indication to zone computer 13. Zone computer 13 responds by transmitting to the vehicle, via zone transmitter 14 and on-board receiver 17, initial information needed by vehicle control unit 10, such as the communication frequencies in the first zone encountered (the initialization zone). The driver is then requested to indicate the vehicle destination, by means of driver interface unit 19, and is instructed, via driver interface unit 19, to enter the highway.

If the highway has been entered from the right, the vehicle proceeds, under driver control, in the rightmost highway lane. Still under driver control, the vehicle enters the next zone (the merge zone). The point of departure from the initialization zone is identified by zone computer 13 from the responses to the sequential magnet configuration at the end of the zone. The initial longitudinal position of vehicle 7 is, accordingly, established.

With the establishment of the initial longitudinal position, the driver is instructed to place the vehicle under full automatic control. This transition is verified through audio and visual signals conveyed to the driver through driver interface unit 19.

In the merge zone, the vehicle remains in the rightmost lane (lane 1). Zone computer 13 facilitates a "merge left" operation by creating, if necessary, a slot for the vehicle to enter in lane 2. When safe merge conditions exist between the entering vehicle and the corresponding leading and trailing vehicles in lane 2, zone computer 13 commands a merge left maneuver as described above.

Departure of the vehicle from the highway is scheduled by central management computer 1. At an appropriate time, the vehicle is commanded, from the wayside, to begin a series of lane changes that will place the vehicle in the rightmost lane. When the vehicle has reached this lane, the driver is instructed to take over control of the vehicle. After completion of this transition, the driver removes the vehicle from the highway via the next exit.

Zone computer 13 generates a timing signal that is the basis of timing of communications from wayside to vehicles and the reverse. The timing signals of all zone computers are synchronized. The timing signal is transmitted to all vehicles assigned to the zone, and is the basis of timing operations on board the vehicles.

At some point, while a vehicle is traversing a zone, it receives, from the wayside, information regarding the transmission and reception frequencies to be employed in the next downstream zone. After a vehicle has penetrated the downstream zone, as determined by zone computer 13, the vehicle receives instructions from zone computer 13 to change its zone assignment, and to change to the new frequency basis, at a designated point in time. This information is received by vehicle control unit 10 which implements the changes required by the new zone assignment.

At the designated time, zone computer 13 hands off responsibility for the vehicle to downstream zone computer 16 and the wayside/vehicle communications process shifts to the downstream zone.

Three priorities are distinguished for wayside/vehicle messages:

First-priority messages are time-critical and must be transmitted at the earliest time permitted by the communications subsystems. These messages include magnet sensor indications, allowing the measurement of vehicle position to be as up-to-date as possible, and emergency stopping commands.

Second-priority messages are non-time-critical and can be transmitted with timing delays an order of magnitude greater than the delays of time-critical messages. Messages in this category include speed-change commands, commands to change to a new zone and frequency basis at a designated future time, lane-change commands, directional change commands, commands to change vehicle status from driver-controlled to automatic and the reverse, status-confirming signals, and signals to activate "canned" audio and visual messages to drivers via driver interface unit 19.

Third-priority messages are sent at any time during a vehicle's traverse of a zone. These messages include the next zone assignment and the transmission and reception frequencies of the downstream zone.

First-priority messages are transmitted periodically with a very short period (of the order 0.038 sec). Second-priority messages are transmitted periodically with a period of the order 0.38 sec.

Within a zone, messages are frequency multiplexed to separate priority classes, each zone having a unique set of transmission and reception frequencies. Frequency shifting to distinguish ones from zeros in binary messages is also employed. Communication between on-board transmitter 11 and zone receiver 12, and between zone transmitter 14 and on-board receiver 17, is carried out through time-division multiplexing.

The period of transmission, for each priority class, is divided into time slots, a time slot being assigned to each vehicle when it is assigned to a zone. The period of the first-priority message timing signal, the quantity of information to be included in the first-priority transmissions, and the maximum number of vehicles to be accommodated within a zone, determine the rate of transmission of information.

At an assumed maximum speed of 55 mph, a vehicle will travel, at most, 3.065 ft (0.934 meters) in 0.038 sec. As previously noted, marker numerical readings are available at one-meter spacings. Hence, at maximum speed, a new marker reading will be available for transmission to the wayside in each transmission interval, about 93 percent of the time.

At two-second headways, 260 vehicles can be accommodated within a four-lane highway two miles in length. The time slot width per vehicle for first priority messages is 0.038/260 = 1436.1 microsec. Three-bit first-priority messages, necessary for relaying a sensor reading to the wayside, require a data rate of 3/146.1 microsec = 20,534 bits/sec.

2. Fail-Operational Configuration

The invention as described above will cease to function as a longitudinal control and collision avoidance system if a critical component such as a receiver, or a critical subsystem such as a computer, fails. The invention has built-in protection against a magnet sensor failure; however modification of the basic configuration is necessary to prevent a hazardous condition from arising as a result of component or subsystem failure.

Rail system practice reduces the probability of occurrence of hazardous conditions to an extremely low level through employment of highly reliable "vital" relays as critical safety system elements. These relays have been shown, through experience, to have negligible probability of failure in an unsafe state. Rail system practice further reduces the probability of occurrence of hazardous conditions by insuring that such conditions can not result from failure of a single nonvital element. These practices make train control systems essentially invulnerable to occurrence of hazardous conditions as a result of component or subsystem failure.

In this invention, protection against failure of a component or subsystem is achieved through employment of redundant communication and computation elements combined into redundant communication and computation channels. Discrimination between functioning and nonfunctioning elements is accomplished through a voting process, two-out-of-three nominally identical inputs being accepted as correct if the third input differs from the other two. A discrimination device performs this process and designates one of the two functioning elements as the operative element, while removing the nonfunctioning element from effect on the system. Devices that perform this process are well known in the control system art and are commonly termed voters or comparators. A vital comparator achieves fail-safe operation through a combination of voting, cross-checking between redundant elements and self-checking within redundant elements.

Use of redundant elements in conjunction with vital comparators allows achievement of "fail-operational" in addition to "fail-safe" performance. A fail-safe configuration provides protection from hazardous situations but may involve inconvenient operations such as emergency stopping of one or more vehicles and extrication of the failed vehicle through pushing or towing. A configuration that is fail operational as well as fail safe allows vehicles to proceed safely, in the event of a failure, possibly with reduced speed, so that the vehicle can be withdrawn from the system, for off-line repair, with minimum disruption of operations. In the following, a fail-operational configuration is described.

The system configurations described below, employing redundant subsystems and vital comparators, will provide fail-safe and fail-operational performance. Magnet groupings for a fail-safe and fail-operational configuration of this invention are as described above.

Figure 6:
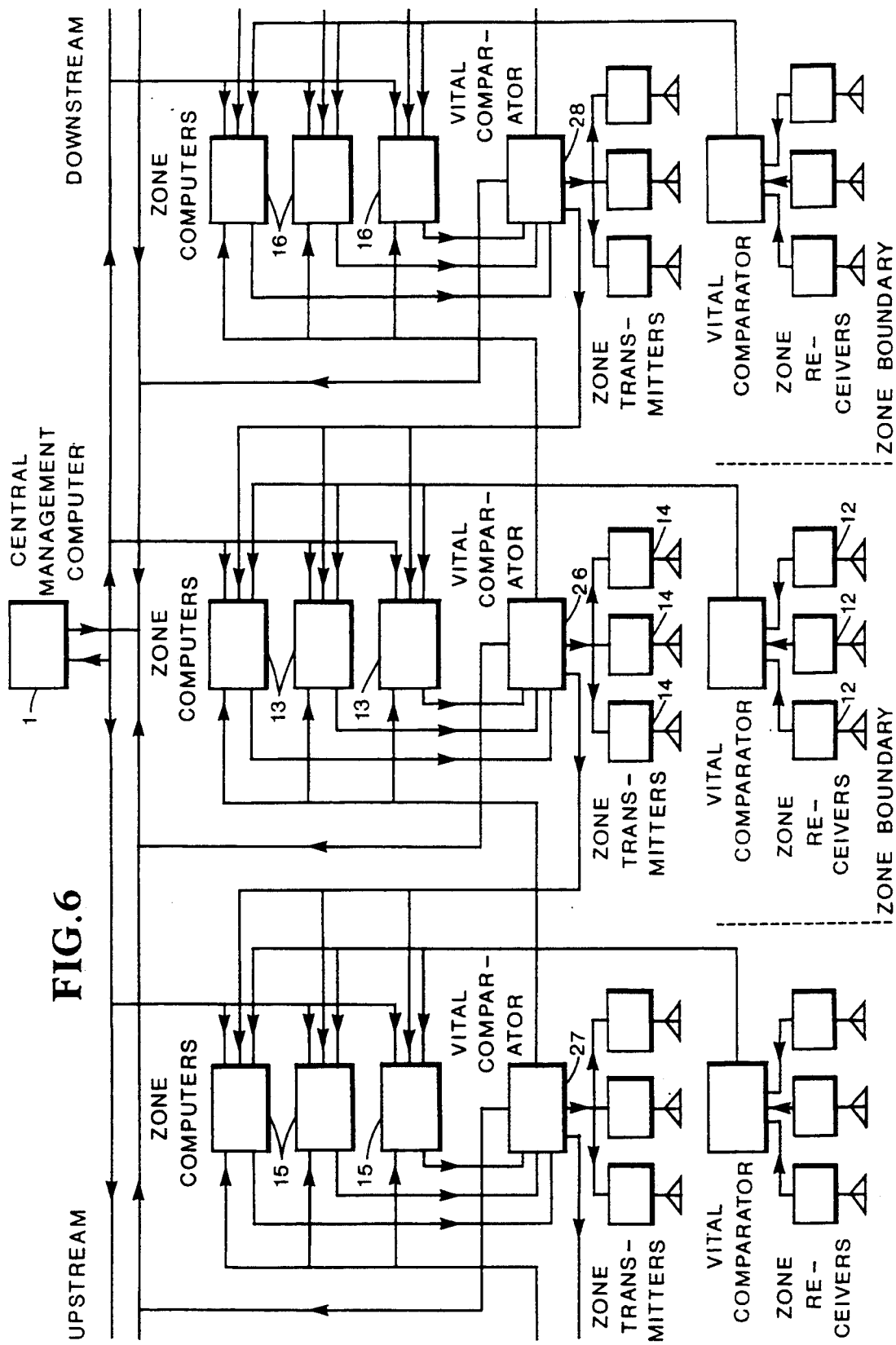
FIG. 6 is a block diagram illustrating the major wayside elements of a fail-operational configuration of the invention.
Figure 7:
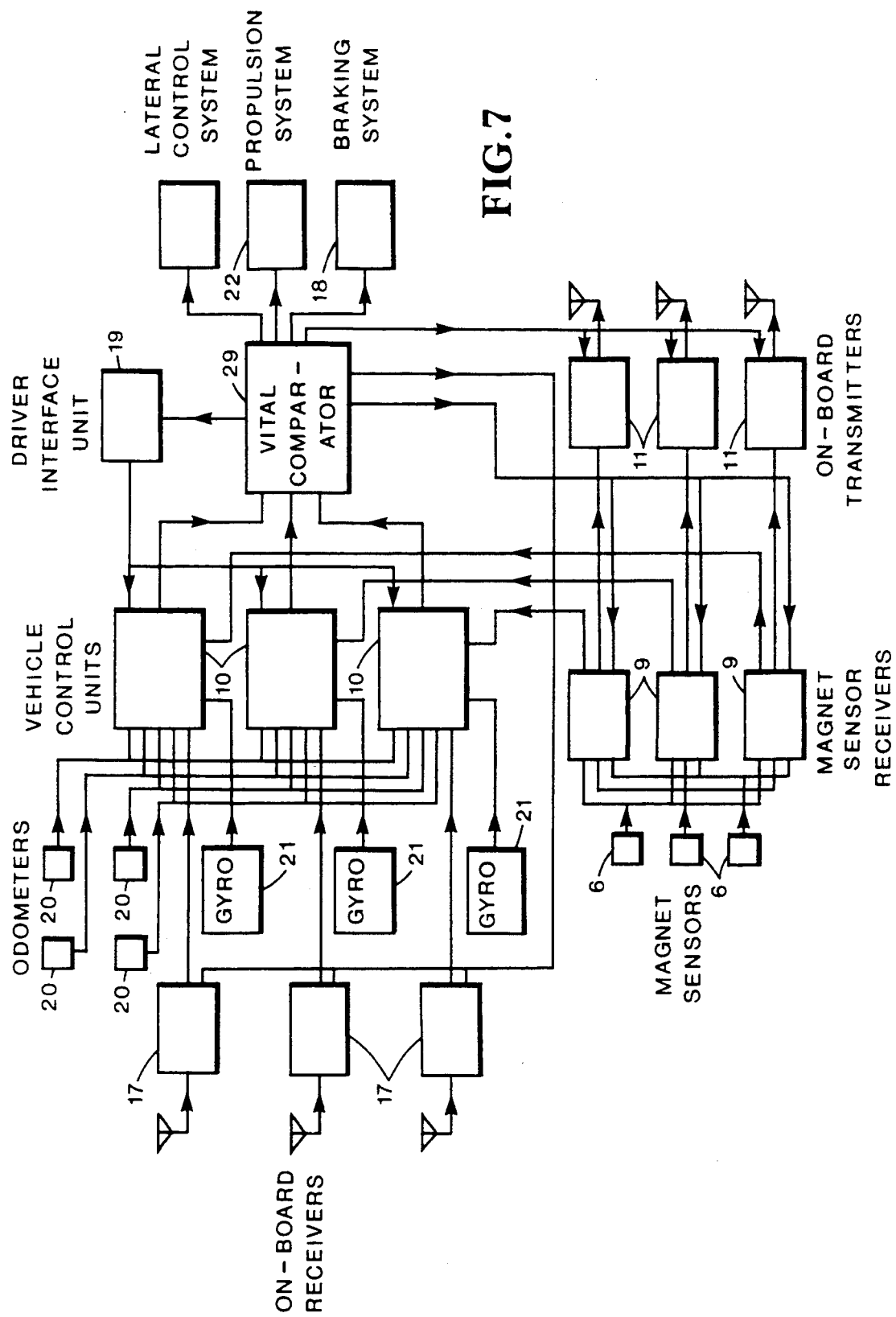
FIG. 7 is a block diagram illustrating the major elements on board each vehicle in a fail-operational configuration of the invention.

In the fail-operational configuration, shown in FIGS. 6 and 7, all magnet sensor outputs are received by three independent magnet sensor receivers 9. These units receive three identical parallel inputs and produce three identical serial outputs for transfer to three on-board radio transmitters 11; however, only alternate magnet readings are transmitted to the wayside as already discussed.

The transmitters modulate their input signals and transmit them to three zone receivers 12 at the wayside, each transmitter 11 being linked with one of the three receivers 12 by a common frequency band in each message priority category. The transmitter signals are time-division multiplexed, as discussed above.

The receivers demodulate the received signals and present the demodulated signals as inputs to zone input vital comparator 25, which designates one of the three receivers 12 as the operative receiver. If all system elements are fully operational, to this point, the outputs of the three receivers are identical. If an element of the vehicle-to-wayside communications subsystem has failed, the receiver designated by comparator 25 as the operative receiver belongs to one of the two unaffected channels. In the event of a malfunction, the action of comparator 25 also serves a partial diagnostic function through identification of the vehicle-to-wayside communications subsystem as the malfunctioning element.

The output of the operative receiver provides identical presence sensor input information for three identical zone computers 13. Zone computers 13 operate on the input information as described under 1. Basic Configuration. The outputs of zone computers 13 are presented as inputs to zone output vital comparator 26 which designates one of the three zone computers 13 as the operative zone computer. Selected outputs of the operative zone computer are routed to three zone radio transmitters 14, to three zone computers 15 in the upstream zone and to three zone computers 16 in the downstream zone. Zone computers 13 receive corresponding selected outputs from the action of comparator 27 serving upstream zone computers 15 and the action of comparator 28 serving downstream zone computers 16, these comparators designating operative computers in their respective zones. As already noted, exchange of information between zone computers is needed for handoff of responsibility for vehicles crossing zone boundaries and for determination of intervehicle distances.

Zone transmitters 14 modulate the inputs received from the operative zone computer and transmit these inputs to vehicles 7, each vehicle receiving inputs via three on-board radio receivers 17, each transmitter 14 being linked with one of the three receivers 17. The demodulated outputs of receivers 17 are presented as inputs to three on-board vehicle control units 10, each receiver 17 being connected to one of the three control units 10. The outputs of vehicle control units 10 are monitored for coincidence by on-board vital comparator 29 which designates the operative vehicle control unit. The operative vehicle control unit is responsible for control of timing and reference frequencies of on-board radio transmitters 11 and on-board radio receivers 17, for transferring information to and receiving information from driver interface unit 19, for determining vehicle speed from data received from presence sensor receiver 9 or odometers 20, for generating analog control signal inputs for vehicle braking system 18 and vehicle propulsion system 22, and for generating steering signals required as inputs by the lateral control system for following highway changes in direction and effecting lane changes.

What is claimed is:

1. A vehicle longitudinal control and collision avoidance system, for vehicles operating on a multilane highway, comprising:
    a plurality of permanent magnets distributed along the highway in a specified pattern and embedded in the highway surface, each said permanent magnet having a specified orientation,
    permanent magnet sensing means, emplaced on board each vehicle, that provide indications of proximity to, and orientation of, said permanent magnets, when said permanent magnets are overpassed by each vehicle,
    computation means at the wayside that are provided with an initial longitudinal position for each vehicle, and with speed limits, and receive, via vehicle-to-wayside data transmission means, outputs of said permanent magnet sensing means, and generate the longitudinal position of each vehicle and longitudinal control outputs comprising vehicle speed commands, and vehicle braking commands to protect a trailing vehicle against collision with a leading vehicle, and
    vehicle control means included in each vehicle that receive, via wayside-to-vehicle data transmission means, said longitudinal control outputs and execute said vehicle speed commands, and said vehicle braking commands, by generating inputs to automatically control the vehicle propulsion system and the vehicle braking system of each vehicle.

2. A vehicle longitudinal control and collision avoidance system, as claimed in claim 1, wherein said computation means, additionally, generate lateral control outputs comprising vehicle steering commands causing vehicles to depart from a first highway lane to enter a second highway lane, and said vehicle control means receive, via said wayside-to-vehicle data transmission means, said lateral control outputs and execute said vehicle steering commands by generating inputs for a vehicle lateral control system, said computation means generating said lateral control outputs to insure that said vehicles arrive at preselected highway exits and to control vehicle distribution on the highway.

3. A vehicle longitudinal control and collision avoidance system, as claimed in claim 2, wherein said computation means generate additional lateral control outputs comprising additional vehicle steering commands causing vehicles to follow highway changes in direction, and said vehicle control means receive, via said wayside-to-vehicle data transmission means, said additional lateral control outputs and execute said additional vehicle steering commands by generating inputs for said vehicle lateral control system.

4. A vehicle longitudinal control and collision avoidance system, as claimed in claim 3, wherein said permanent magnets are arranged in groups that are emplaced in specified longitudinal positions along the highway, each said magnet encodes, by its orientation, binary information, and each group of magnets encodes a number, said number being associated with the longitudinal position of each said group of magnets along the highway, and wherein said permanent magnet sensing means on board a vehicle comprise permanent magnet sensors that are emplaced in specified locations on board the vehicle, said permanent magnet sensors providing, as outputs, a magnetically sensed number, encoded by said group of permanent magnets, when said group of permanent magnets is overpassed by the vehicle, each vehicle having said permanent magnet sensors so emplaced.

5. A vehicle longitudinal control and collision avoidance system, as claimed in claim 4, wherein said computation means, additionally,
    store said numbers, encoded by said groups of magnets, in association with said associated longitudinal positions,
    compare each magnetically sensed number with a corresponding stored number, each said magnetically sensed number being associated with a corresponding generated longitudinal position that is equal to the longitudinal position associated with said corresponding stored number, and
    recognize an error in the operation of said permanent magnet sensing means, said vehicle-to-wayside data transmission means or said computation means, when said magnetically sensed number is not equal to said corresponding stored number,
the recognized error providing warning of a system malfunction.

6. A vehicle longitudinal control and collision avoidance system, as claimed in claim 5, wherein a sequence of numbers encoded by a sequence of said permanent magnet groups comprise a pseudo-random sequence.

7. A vehicle longitudinal control and collision avoidance system, as claimed in claim 3, wherein said vehicle-to-wayside data transmission means comprise:

a radio transmitter, on board each vehicle, that receives, as inputs, outputs of said permanent magnet sensing means, and a multiplicity of radio receivers at the wayside, each said radio receiver being associated with a specified length of highway called a zone, and wherein each vehicle is assigned to a zone, a zone radio receiver receives messages from the on-board radio transmitters of vehicles assigned to said zone, and the outputs of said zone radio receiver are presented, as inputs, to said computation means.

8. A vehicle longitudinal control and collision avoidance system, as claimed in claim 7, wherein said computation means comprise:

a multiplicity of computers at the wayside, each said computer being associated with a zone and receiving inputs from said zone radio receiver, each zone computer generating said longitudinal control outputs and said lateral control outputs for vehicles assigned to said zone, each said zone computer, additionally, receiving inputs from and generating outputs for said zone computers associated with neighboring zones, and a central management computer that receives inputs from and generates outputs for said zone computers and provides means for monitoring the speeds and positions of all vehicles operating on the highway, means for communicating said speed limits and vehicle destinations to said zone computers, and means for intervention in the operation of the vehicle control means by a human system monitor.

9. A vehicle longitudinal control and collision avoidance system, as claimed in claim 8, wherein said wayside-to-vehicle data transmission means comprise:

a multiplicity of radio transmitters at the wayside, each said radio transmitter being associated with a zone, and a radio receiver, on board each vehicle, that receives messages from said radio transmitter that is associated with the zone to which the vehicle is assigned, and wherein each said zone computer provides said longitudinal control outputs, and said lateral control outputs, for vehicles assigned to said zone, which are presented as inputs to the zone radio transmitter.

10. A vehicle longitudinal control and collision avoidance system, as claimed in claim 9, wherein said vehicle control means comprise a vehicle control unit on board each vehicle that receives, as inputs, the outputs of the on-board radio receiver and generates, therefrom, outputs that are applied as inputs to said vehicle propulsion system and said vehicle braking system to cause vehicle longitudinal motions that have specified acceleration, deceleration and jerk limits.

11. A vehicle longitudinal control and collision avoidance system, as claimed in claim 10, wherein said vehicle control unit, additionally, generates outputs that are applied as inputs to said vehicle lateral control system to cause vehicle lateral motion.

12. A vehicle longitudinal control and collision avoidance system, as claimed in claim 11, wherein each said zone computer determines the longitudinal positions of vehicles assigned to the zone of said zone computer, and wherein a first zone computer, associated with a first zone, receives inputs from a second zone computer that is associated with a second zone that is downstream from and adjacent to said first zone, and said second zone computer receives inputs from said first zone computer, said inputs to said first zone computer including the longitudinal positions of vehicles assigned to said second zone, to enable said first zone computer to generate said longitudinal control outputs to protect vehicles assigned to said first zone against collision with vehicles assigned to said second zone, and to enable said first zone computer to transfer the computation and communication functions, for a vehicle, to said second zone computer, and to said radio transmitter and said radio receiver associated with said second zone, when the zone assignment of the vehicle changes from said first zone to said second zone.

13. A vehicle longitudinal control and collision avoidance system, as claimed in claim 12, comprising, additionally, a driver interface unit, on board each vehicle, wherein said driver interface unit accepts inputs from the driver for communication to said vehicle control unit and accepts inputs from said vehicle control unit for display and audio communication to the driver, inputs to said vehicle control unit from said driver interface unit being communicated to said zone computer, via said vehicle-to-wayside data transmission means, and inputs to said driver interface unit from said vehicle control unit being received from said zone computer via said wayside-to-vehicle data transmission means and said driver interface unit further comprising interaction means for effecting transfer of control of the vehicle from the driver to the vehicle control unit and from the vehicle control unit to the driver.

14. A vehicle longitudinal control and collision avoidance system, as claimed in claim 13, comprising, additionally, odometers at the wheels of each vehicle to measure incremental wheel rotations, the outputs of said odometers being communicated to said vehicle control unit and providing measures of the motion of the vehicle along its longitudinal axis.

15. A vehicle longitudinal control and collision avoidance system, as claimed in claim 14, comprising, additionally, a gyroscope mounted in each vehicle to measure incremental rotational motion of the vehicle around its vertical axis, the output of said gyroscope being communicated to said vehicle control unit, said vehicle control unit generating, from the output of said gyroscope, and from the outputs of said odometers, measures of the longitudinal and lateral displacement of the vehicle from a reference point, when the vehicle departs from a first highway lane to enter a second highway lane, said measures of longitudinal and lateral displacement being communicated to said zone computer via said vehicle-to-wayside data transmission means, said zone computer generating, from said measures of longitudinal and lateral displacement, and from the longitudinal and lateral positions of neighboring vehicles, vehicle longitudinal control outputs to protect the vehicle against collision with neighboring vehicles, and vehicle lateral control outputs to effect the vehicle transition from said first highway lane to said second highway lane.

16. A vehicle longitudinal control and collision avoidance system, as claimed in claim 15, wherein the transmissions of each said zone radio transmitter comprise sequentially and simultaneously transmitted messages, each said message being assigned to a priority category by said zone computer associated with the zone of said zone radio transmitter, said messages being transmitted in several frequency bands, each frequency band being uniquely associated with the priority category of said message and the zone of said zone radio transmitter, and wherein said longitudinal control outputs and said lateral control outputs generated by said zone computer additionally provide:

frequency information to enable the reception bands of said radio receivers on board vehicles assigned to the zone of said zone computer to conform to the transmission bands of said zone radio transmitter and to enable the transmission bands of said radio transmitters on board the vehicles to conform to the reception bands of said zone radio receiver, and timing information to provide a time reference for operations of said vehicle control units on board vehicles assigned to the zone of said zone computer, to provide a time reference for changes in vehicle zone assignment, and to enable said on-board radio receivers and said on-board radio transmitters to communicate with said zone radio transmitter and said zone radio receiver, respectively, during designated, repetitive, communication time intervals, each vehicle being assigned a periodic communication time interval, non-overlapping with the communication time intervals assigned to the other vehicles assigned to the zone.

17. A vehicle longitudinal control and collision avoidance system, as claimed in claim 16, wherein the transmissions of said on-board radio transmitter of each vehicle comprise sequentially and simultaneously transmitted messages received from said permanent magnet sensing means, and from said vehicle control unit, each said message being assigned to a message priority category, said messages being transmitted in several frequency bands, each frequency band being uniquely associated with the priority category of said message and the zone to which the vehicle is assigned, and wherein said vehicle control unit provides inputs to said on-board radio receiver to control the reception bands of said on-board radio receiver, provides inputs to said on-board radio transmitter to control the transmission bands of said on-board radio transmitter, in accordance with the assigned zone of the vehicle, formats and assigns priority categories to messages communicated to said on-board radio transmitter, controls, through inputs to said on-board radio receiver and said on-board radio transmitter, the timing of transmissions and receptions in accordance with said communication time intervals assigned to the vehicle by said zone computer, assigns the vehicle to a specified zone, in accordance with information received from said zone computer, determines vehicle speed from inputs received from said permanent magnet sensing means when the vehicle is not departing from a first highway lane to enter a second highway lane, determines vehicle speed from said odometers when the vehicle is departing from a first highway lane to enter a second highway lane, controls and regulates vehicle speed and controls vehicle braking by providing inputs for said vehicle propulsion and braking systems in accordance with said longitudinal control outputs, and controls vehicle steering in accordance with said lateral control outputs received from said zone computer.

18. A vehicle longitudinal control and collision avoidance system, as claimed in claim 17, wherein said permanent magnets are arranged in groups that are emplaced in specified longitudinal positions along the highway, each said magnet encodes, by its orientation, binary information, and each group of magnets encodes a number, said number being associated with the longitudinal position of each said group of magnets along the highway, and wherein said permanent magnet sensing means on board a vehicle comprise:

permanent magnet sensors that are emplaced in specified locations on board the vehicle, said permanent magnet sensors providing, as outputs, a magnetically sensed number, when said group of permanent magnets is overpassed by the vehicle, each vehicle having said permanent magnet sensors so emplaced, and a magnet sensor receiver that receives the outputs of said magnet sensors, and registers the encoded number sensed by said magnet sensors, the contents of said magnet sensor receiver being provided as an input to said on-board radio transmitter.

19. A vehicle longitudinal control and collision avoidance system, as claimed in claim 18, wherein each said zone computer, additionally, stores said numbers, encoded by said groups of magnets, in association with said associated longitudinal positions, compares each magnetically sensed number with a corresponding stored number, each said magnetically sensed number being associated with a corresponding generated longitudinal position that is equal to the longitudinal position associated with said corresponding stored number, and recognizes an error in the operation of said permanent magnet sensing means, said vehicle-to-wayside data transmission means or said computation means, when said magnetically sensed number is not equal to said stored number, the recognized error providing warning of a system malfunction.

20. A vehicle longitudinal control and collision avoidance system, as claimed in claim 19, wherein a sequence of numbers encoded by a sequence of said permanent magnet groups comprise a pseudo-random sequence.

21. A vehicle longitudinal control and collision avoidance system, as claimed in claim 20, wherein, in a designated area, the sequence of numbers encoded by said sequence of permanent magnet groups embedded in the highway identify a longitudinal position and enable said zone computer to be provided, from the outputs of said permanent magnet sensors, with an accurate initial longitudinal position of a vehicle that overpasses said sequence of permanent magnet groups.

22. A vehicle longitudinal control and collision avoidance system, as claimed in claim 3, wherein said vehicle-to-wayside data transmission means comprise:

three radio transmitters, on board each vehicle, that receive, as inputs, the outputs of said permanent magnet sensing means, and a multiplicity of radio receivers at the wayside, each said radio receiver being associated with a specified length of highway called a zone, three of said radio receivers being associated with each zone, wherein each vehicle is assigned to a zone, a zone radio receiver receives messages from one of said on-board radio transmitters of each vehicle assigned to the zone, and the outputs of said zone radio receivers, associated with a zone, are presented, as inputs, to comparator means that determine if the outputs of one of said zone radio receivers do not conform to the outputs of the other said zone radio receivers associated with the zone, and designate one of said zone radio receivers, having outputs that conform to the outputs of another said zone radio receiver, as the operative zone radio receiver, the outputs of said operative zone radio receiver being presented, as inputs, to said computation means.

23. A vehicle longitudinal control and collision avoidance system, as claimed in claim 22, wherein said computation means comprise:
a multiplicity of computers at the wayside, three of said computers being associated with each zone and receiving the same inputs from said operative zone receiver, the outputs of the three zone computers associated with a zone being presented as inputs to comparator means that determine if the outputs of one of said zone computers do not conform to the outputs of the other said zone computers associated with the zone and designate one of said zone computers having outputs that conform to the outputs of another of said zone computers associated with the zone as the operative zone computer, said zone computers generating said longitudinal control outputs and said lateral control outputs for vehicles assigned to the zone of said zone computers, said zone computers, additionally, receiving inputs from the operative zone computers associated with neighboring zones, said operative zone computer providing inputs for the zone computers associated with said neighboring zones, said three zone computers associated with a zone receiving the same inputs, and
a central management computer that receives inputs from said operative zone computers and generates outputs for said zone computers, said three zone computers associated with the zone receiving the same outputs from said central management computer, said central management computer providing means for monitoring the speeds and positions of all vehicles operating on the highway, means for communicating said speed limits and vehicle destinations to said zone computers, and means for intervention in the operation of the vehicle control means by a human system monitor.

24. A vehicle longitudinal control and collision avoidance system, as claimed in claim 23, wherein said wayside-to-vehicle data transmission means comprise:
a multiplicity of radio transmitters at the wayside, three of said radio transmitters being associated with each zone, and three radio receivers on board each vehicle,
wherein said operative zone computer provides said longitudinal control outputs, and said lateral control outputs for vehicles assigned to the zone, said longitudinal and lateral control outputs being presented as inputs to said three zone radio transmitters, said zone radio transmitters associated with a zone receiving the same inputs, and each of said zone radio transmitters transmitting messages to one of said radio receivers on board each vehicle assigned to the zone.

25. A vehicle longitudinal control and collision avoidance system, as claimed in claim 24, wherein said vehicle control means comprise three vehicle control units on board each vehicle, each said vehicle control unit receiving, as inputs, the outputs of one of said onboard radio receivers, and generating, therefrom, outputs that are applied as inputs to comparator means that determine if the outputs of one of said vehicle control units do not conform to the outputs of the other said vehicle control units and designate one of said vehicle control units, having outputs that conform to the outputs of another of said vehicle control units, as the operative vehicle control unit, said operative vehicle control unit providing inputs to said vehicle propulsion system and said vehicle braking system to cause vehicle longitudinal motions that have specified acceleration, deceleration and jerk limits.

26. A vehicle longitudinal control and collision avoidance system, as claimed in claim 25, wherein said operative vehicle control unit, additionally, generates outputs that are applied as inputs to said vehicle lateral control system to cause vehicle lateral motion.

27. A vehicle longitudinal control and collision avoidance system, as claimed in claim 26, wherein each said zone computer determines the longitudinal positions of vehicles assigned to the zone of said zone computer, and wherein said zone computers associated with a first zone, receive inputs from said operative zone computer that is associated with a second zone that is downstream from, and adjacent to, said first zone, and said zone computers associated with said second zone receive inputs from said operative zone computer associated with said first zone, the inputs to said zone computers associated with said first zone including the longitudinal positions of vehicles assigned to said second zone, to enable said zone computers associated with said first zone to generate said longitudinal control outputs to protect vehicles assigned to said first zone against collision with vehicles assigned to said second zone, and to enable said operative zone computer associated with said first zone to transfer the computation and communication functions, for a vehicle, to said zone computers associated with said second zone and to said radio transmitters and said radio receivers associated with said second zone, when the zone assignment of the vehicle changes from said first zone to said second zone.

28. A vehicle longitudinal control and collision avoidance system, as claimed in claim 27, comprising, additionally, a driver interface unit, on board each vehicle, wherein said driver interface unit accepts inputs from the driver for communication to said vehicle control units and accepts inputs from said operative vehicle control unit for display and audio communication to the driver, the inputs to said vehicle control units from said driver interface unit being communicated to said zone computers from said operative vehicle control unit via said vehicle-to-wayside data transmission means, and the inputs to said driver interface unit from said operative vehicle control unit being received from said operative zone computer via said wayside-to-vehicle data transmission means and said driver interface unit further comprising interaction means for effecting transfer of control of the vehicle from the driver to the operative vehicle control unit and from the operative vehicle control unit to the driver.

29. A vehicle longitudinal control and collision avoidance system, as claimed in claim 28, comprising, additionally, odometers at the wheels of each vehicle to measure incremental wheel rotations, the outputs of said odometers being communicated to said vehicle control units and providing measures of the motion of the vehicle along its longitudinal axis.

30. A vehicle longitudinal control and collision avoidance system, as claimed in claim 29, comprising additionally, three gyroscopes mounted in each vehicle to measure incremental rotational motion of the vehicle around its vertical axis, the output of each said gyroscope being communicated to one of said vehicle control units, each said vehicle control unit generating, from the output of said gyroscope, and from the outputs of said odometers, measures of the longitudinal and lateral displacement of the vehicle from a reference point, when the vehicle departs from a first highway lane to enter a second highway lane, said measures of longitudinal and lateral displacement being communicated to said zone computers from said operative vehicle control unit via said vehicle-to-wayside data transmission means, said zone computers generating, from said measures of longitudinal and lateral displacement, and from the longitudinal and lateral positions of neighboring vehicles, said longitudinal control outputs to protect the vehicle against collision with neighboring vehicles, and vehicle lateral control outputs to effect the vehicle transition from said first highway lane to said second highway lane.

31. A vehicle longitudinal control and collision avoidance system, as claimed in claim 30, wherein the transmissions of said zone radio transmitters, associated with a zone, comprise sequentially and simultaneously transmitted messages, each said message being assigned to a priority category by said operative zone computer associated with the zone of said zone radio transmitters, said messages being transmitted in several frequency bands, each frequency band being uniquely associated with the priority category of each message, the zone of the associated zone radio transmitter and the associated zone radio transmitter, and wherein said longitudinal control outputs and said lateral control outputs generated by said zone computers additionally provide:

frequency information to enable the reception bands of each of said radio receivers on board a vehicle assigned to the zone of said zone computers to conform to the transmission bands of one of said zone radio transmitters associated with the zone and to enable the transmission bands of each of said radio transmitters on board the vehicle to conform to the reception bands of one of said zone radio receivers associated with the zone, and timing information to provide a time reference for operations of said vehicle control units on board vehicles assigned to the zone of said zone computers, to provide a time reference for changes in vehicle zone assignment, and to enable said on-board radio receivers and said on-board radio transmitters to communicate with said zone radio transmitters and said zone radio receivers, respectively, during designated, repetitive, communication time intervals, each vehicle being assigned a periodic communication time interval, non-overlapping with the communication time intervals assigned to the other vehicles assigned to the zone.

32. A vehicle longitudinal control and collision avoidance system, as claimed in claim 31, wherein the transmissions of each of said on-board radio transmitters comprise sequentially and simultaneously transmitted messages received from said permanent magnet sensing means and from said operative vehicle control unit, said messages having assigned message priority categories, said messages being transmitted in several frequency bands, each frequency band being uniquely associated with the priority category of each message, the zone to which the vehicle is assigned and said on-board transmitter, and wherein said operative vehicle control unit provides inputs to said on-board radio receivers to control the reception bands of said on-board radio receivers, provides inputs to said on-board radio transmitters to control the transmission bands of said on-board radio transmitters, in accordance with the assigned zone of the vehicle, formats and assigns priority categories to messages communicated to said on-board radio transmitters, controls, through inputs to said on-board radio receivers and said on-board radio transmitters, the timing of transmissions and receptions in accordance with said communication time intervals assigned to the vehicle by said operative zone computer, assigns the vehicle to a specified zone, in accordance with information received from said operative zone computer, determines speed from inputs received from said permanent magnet sensing means when the vehicle is not departing from a first highway lane to enter a second highway lane, determines vehicle speed from said odometers when the vehicle is departing from a first highway lane to enter a second highway lane, controls and regulates vehicle speed and controls vehicle braking by providing inputs for said vehicle propulsion and braking systems in accordance with said vehicle longitudinal control outputs, and controls vehicle steering in accordance with said vehicle lateral control outputs received from said operative zone computer.

33. A vehicle longitudinal control and collision avoidance system, as claimed in claim 32, wherein said permanent magnets are arranged in groups that are emplaced in specified longitudinal positions along the highway, each said magnet encodes, by its orientation, binary information, and each group of magnets encodes a number, said number being associated with the longitudinal position of each said group of magnets along the highway, and wherein said permanent magnet sensing means on board a vehicle comprise:

permanent magnet sensors that are emplaced in specified locations on board the vehicle, said permanent magnet sensors providing, as outputs, a magnetically sensed number when said group of permanent magnets is overpassed by the vehicle, each vehicle having said permanent magnet sensors so emplaced, and three magnet sensor receivers that receive the outputs of said permanent magnet sensors, and register the encoded numbers sensed by said permanent magnet sensors, the contents of each of said magnet sensor receivers being provided as an input to one of said on-board radio transmitters.

34. A vehicle longitudinal control and collision avoidance system, as claimed in claim 33, wherein each said zone computer, additionally, stores said numbers, encoded by said groups of magnets, in association with said associated longitudinal positions, compares each magnetically sensed number with a corresponding stored number, each said magnetically sensed number being associated with a corresponding generated longitudinal position that is equal to the longitudinal position associated with said corresponding stored number, and recognizes an error in the operation of said permanent magnet sensing means, said vehicle-to-wayside data tranmission means or said computation means when a said magnetically sensed number is not equal to said corresponding stored number, the recognized error providing warning of a system malfunction.

35. A vehicle longitudinal control and collision avoidance system, as claimed in claim 34, wherein a sequence of numbers encoded by a sequence of said permanent magnet groups comprise a pseudo-random sequence.

36. A vehicle longitudinal control and collision avoidance system, as claimed in claim 35, wherein, in a designated area, the sequence of numbers encoded by said sequence of permanent magnet groups embedded in the highway identify a longitudinal position and enable said zone computers to be provided, from the outputs of said permanent magnet sensors, with an accurate initial longitudinal position of a vehicle that overpasses said sequence of permanent magnet groups.

37. A vehicle longitudinal control and collision avoidance system, as claimed in claim 1, further comprising wayside admission means that register the identification of a vehicle and assess the operational readiness of the vehicle to enter the highway, when the vehicle, is placed in a highway entrance area by a driver requesting admission for the vehicle onto the highway, the vehicle having on-board identification means, said wayside admission means comprising:

vehicle identification means at the wayside, that register the vehicle identification by interrogating said on-board identification means, a segment of roadway, having embedded therein a test pattern of magnetic markers, and wayside test means that receive said vehicle identification from said vehicle identification means at the wayside, and transmit test signals to the vehicle, via said wayside-to-vehicle data transmission means, said test signals comprising vehicle speed commands and vehicle braking commands, wherein said vehicle control means receive said test signals and execute said vehicle speed commands, and said vehicle braking commands, by generating inputs to control said vehicle propulsion system and said vehicle braking system, said generated intputs causing vehicle motions, on said segment of roadway, that bring said permanent magnet sensing means into proximity with a plurality of said permanent magnets distributed along the highway, the outputs of said permanent magnet sensing means being transmitted to said wayside test means via said vehicle-to-wayside data transmission means, said wayside test means assessing, from said outputs of said permanent magnet sensing means, that said permanent magnet sensing means, said vehicle-to-wayside data transmission means, said wayside-to-vehicle data transmission means, said vehicle control means, said vehicle propulsion system and said vehicle braking system are all operational or that at least one of said permanent magnet sensing means, said vehicle-to-wayside data transmission means, said wayside-to-vehicle data transmission means, said vehicle control means, said vehicle propulsion system and said vehicle braking system is nonoperational, the assessment being performed through comparison of the outputs of said permanent magnet sensing means with reference data, thereby verifying, or failing to verify, the operational readiness of the vehicle to enter the highway.

38. A vehicle longitudinal control and collision avoidance system, for vehicles operating on a multilane highway, comprising:

odometers at the wheels of each vehicle, the outputs of said odometers providing measures of incremental wheel rotations, computation means at the wayside that are provided with an initial longitudinal position for each vehicle, and with speed limits, and receive, via vehicle-to-wayside data transmission means, the outputs of said odometers, and generate the longitudinal position of each vehicle and longitudinal control outputs comprising vehicle speed commands, and vehicle braking commands to protect a trailing vehicle against collision with a leading vehicle, and vehicle control means included in each vehicle that receive, via wayside-to-vehicle data transmission means, said longitudinal control outputs and execute said vehicle speed commands, and said vehicle braking commands, by generating inputs to automatically control the vehicle propulsion system and the vehicle braking system of each vehicle.

39. A vehicle longitudinal control and collision avoidance system, as claimed in claim 38, wherein said computation means, additionally, generate lateral control outputs comprising vehicle steering commands, and said vehicle control means receive, via said wayside-to-vehicle data transmission means, said lateral control outputs and execute said vehicle steering command by generating inputs for a vehicle lateral control system.

40. A vehicle longitudinal control and collision avoidance system, for vehicles operating on a multilane highway, comprising:

a plurality of permanent magnets distributed along the highway in a specified pattern and embedded in the highway surface, each said permanent magnet having a specified orientation, permanent magnet sensing means, emplaced on board each vehicle, that provide indications of proximity to, and orientation of, said permanent magnets, when said permanent magnets are overpassed by a vehicle, odometers at the wheels of each vehicle, the outputs of said odometers providing measures of incremental wheel rotations, computation means at the wayside that are provided with an initial longitudinal position for each vehicle, and with speed limits, and receive, via vehicle-to-wayside data transmission means, the outputs of said odometers, and generate, therefrom, the longitudinal position of each vehicle and longitudinal control outputs comprising vehicle speed commands, and vehicle braking commands to protect a trailing vehicle against collision with a leading vehicle, and vehicle control means, included in each vehicle, that receive, via wayside-to-vehicle data transmission means, said longitudinal control outputs and execute said vehicle speed commands, and said vehicle braking commands, by generating inputs to automatically control the vehicle propulsion system and the vehicle braking system of each vehicle, said vehicle control means further receiving outputs of said permanent magnet sensing means, and the outputs of said odometers, to generate calibration corrections for said odometers, which are applied by said vehicle control means to the outputs of said odometers.

41. A vehicle longitudinal control and collision avoidance system, as claimed in claim 40, wherein said computation means, additionally, generate lateral control outputs comprising vehicle steering commands, and said vehicle control means receive, via said wayside-to-vehicle data transmission means, said lateral control outputs and execute said vehicle steering commands by generating inputs for a vehicle lateral control system.

42. A vehicle longitudinal control and collision avoidance system, for vehicles operating on a multilane highway, comprising:
  means, on board each vehicle, to measure the incremental longitudinal motion of the vehicle,
  computation means, at the wayside, that are provided with an initial longitudinal position for each vehicle, and with speed limits, and receive, via vehicle-to-wayside data transmission means, outputs of said on-board means to measure the incremental longitudinal motion of the vehicles, and generate the longitudinal position of each vehicle and longitudinal control outputs comprising vehicle speed commands, and vehicle braking commands to protect a trailing vehicle against collision with a leading vehicle, and
  vehicle control means included in each vehicle that receive, via wayside-to-vehicle data transmission means, said longitudinal control outputs and execute said vehicle speed commands, and said vehicle braking commands, by generating inputs to automatically control the vehicle propulsion system and the vehicle braking system of each vehicle.

43. A vehicle longitudinal control and collision avoidance system, as claimed in claim 42, wherein said computation means, additionally, generate lateral control outputs comprising vehicle steering commands, and said vehicle control means receive, via said wayside-to-vehicle data transmission means, said lateral control outputs and execute said vehicle steering commands by generating inputs for a vehicle lateral control system.

44. A vehicle longitudinal control and collision avoidance system, as claimed in claim 43, wherein said vehicle-to-wayside data transmission means comprise:
  three radio transmitters on board each vehicle, that receive, as inputs, the outputs of said means to measure the incremental motion of the vehicle, and
  a multiplicity of radio receivers at the wayside, each said radio receiver being associated with a specified length of highway called a zone, three of said radio receivers being associated with each zone,
wherein each vehicle is assigned to a zone, each of said zone radio receivers receives messages from one of said on-board radio transmitters of each vehicle assigned to the zone, and the outputs of said zone radio receivers, associated with each zone, are presented, as inputs, to comparator means that determine if the outputs of one of said zone radio receivers do not conform to the outputs of the other said zone radio receivers associated with the zone, and designate one of said zone radio receivers, having outputs that conform to the outputs of another of said zone radio receivers, as the operative zone radio receiver, the outputs of said operative zone radio receiver being presented, as inputs, to said computation means.

45. A vehicle longitudinal control and collision avoidance system, as claimed in claim 44, wherein said wayside-to-vehicle data transmission means comprise:
  a multiplicity of radio transmitters at the wayside, three of said radio transmitters being associated with each zone, and
  three radio receivers on board each vehicle,
wherein said computation means provide said longitudinal control outputs, and said lateral control outputs, for each vehicle, which are presented as inputs to said zone radio transmitters, said three zone radio transmitters associated with each zone receiving the same inputs, and each of said zone radio transmitters transmitting messages to one of said radio receivers on board each vehicle assigned to the zone, and the outputs of said radio receivers on board each vehicle are presented, as inputs, to comparator means that determine if the outputs of one of said on-board radio receivers do not conform to the outputs of the other said radio receivers on board the vehicle, and designate one of said on-board radio receivers, having outputs that conform to the outputs of another of said radio receivers on board the vehicle, as the operative vehicle radio receiver, the outputs of said operative vehicle radio receiver being presented, as inputs, to said vehicle control means.

46. A vehicle longitudinal control and collision avoidance system, for vehicles operating on a multilane highway, comprising:
  means, on board each vehicle, to measure the incremental longitudinal motion of the vehicle,
  gyroscope means, mounted in each vehicle, to measure the incremental motion of the vehicle around its vertical axis,
  computation means, at the wayside, that are provided with an initial longitudinal position for each vehicle, and with speed limits, and receive, via vehicle-to-wayside data transmission means, outputs of said means to measure the incremental longitudinal motion of the vehicles, and generate the longitudinal position of each vehicle, and longitudinal control outputs comprising vehicle speed commands and vehicle braking commands to protect a trailing vehicle against collision with a leading vehicle, and lateral control outputs comprising vehicle steering commands causing vehicles to follow highway changes in direction and to effect vehicle transitions from a first highway lane to a second highway lane, and
  vehicle control means that receive, via wayside-to-vehicle data transmission means, said longitudinal control outputs and execute said vehicle speed commands, and said vehicle braking commands, by generating inputs to automatically control the vehicle propulsion system and the vehicle braking system of each vehicle, and receive said lateral control outputs and execute said vehicle steering commands by generating inputs for a vehicle lateral control system, said vehicle control means, further, receiving outputs of said gyroscope means and said means to measure the incremental longitudinal motion of the vehicle and generating measures of the longitudinal and lateral displacement of the vehicle from a reference point, when the vehicle departs from said first highway lane to enter said second highway lane, said measures of longitudinal and lateral displacement being communicated from said vehicle control means to said computation means via said vehicle-to-wayside data transmission means.

* * * * *